(12) United States Patent
Stephen

(10) Patent No.: US 9,188,264 B2
(45) Date of Patent: Nov. 17, 2015

(54) FLANGE PIPE COUPLING

(75) Inventor: Robert Stephen, Aberdeenshire (GB)

(73) Assignee: Equalizer Flange Integrity Systems Limited, Aberdeen (GB)

(*) Notice: Subject to any disclaimer, the term of this patent is extended or adjusted under 35 U.S.C. 154(b) by 17 days.

(21) Appl. No.: 13/817,225

(22) PCT Filed: Feb. 9, 2012

(86) PCT No.: PCT/GB2012/050284
§ 371 (c)(1),
(2), (4) Date: Mar. 8, 2013

(87) PCT Pub. No.: WO2012/107766
PCT Pub. Date: Aug. 16, 2012

(65) Prior Publication Data
US 2013/0221666 A1 Aug. 29, 2013

(30) Foreign Application Priority Data

Feb. 10, 2011 (GB) .................................. 1102369.4

(51) Int. Cl.
*F16L 23/00* (2006.01)
*F16L 23/036* (2006.01)
*B23P 19/00* (2006.01)

(52) U.S. Cl.
CPC ............... *F16L 23/036* (2013.01); *B23P 19/00* (2013.01); *F16L 23/003* (2013.01); *Y10T 29/49948* (2015.01)

(58) Field of Classification Search
USPC ............ 285/412, 15, 114, 414, 415, 418, 406
See application file for complete search history.

(56) References Cited

U.S. PATENT DOCUMENTS

| 1,514,803 | A | 11/1924 | Souter et al. |
| 4,636,120 | A | 1/1987 | Brandsberg et al. |
| 4,927,181 | A * | 5/1990 | Ciotola ............................ 285/15 |
| 5,226,765 | A | 7/1993 | Walton |
| 5,692,544 | A * | 12/1997 | Friedrich et al. ................. 138/99 |
| 6,467,811 | B2 * | 10/2002 | Mitchell ........................... 285/15 |

(Continued)

FOREIGN PATENT DOCUMENTS

| DE | 102006016238 A1 | 10/2007 |
| FR | 1079328 A | 11/1954 |

(Continued)

OTHER PUBLICATIONS

Dauvergne, Bertrand, "International Search Report", for PCT/GB2012/050284, as mailed May 30, 2012, 4 pages.

*Primary Examiner* — Aaron Dunwoody
(74) *Attorney, Agent, or Firm* — Winstead PC

(57) ABSTRACT

Apparatus and method for clamping a flanged joint, comprising a clamp having first and second clamp devices applied to circumferentially separate portions of the flanges, each device having a foot to engage an outer face of a flange, and a force driver adapted to press the flanges together from opposite sides of the flanged connection. The clamping devices are circumferentially spaced apart on the flange, and a foot portion is adapted to engage the outer face of each flange circumferentially between the bolts, to allow transmission of forces to the flanges without applying forces to the bolts, or the nuts or other fixings attached thereto. The clamping force is applied not through the existing bolts passing through the flanges, but through the clamping device of the invention.

24 Claims, 7 Drawing Sheets

(56) References Cited

U.S. PATENT DOCUMENTS

2009/0200797 A1* 8/2009 Carson et al. ................ 285/323
2010/0244443 A1 9/2010 Irgens

FOREIGN PATENT DOCUMENTS

| GB | 2160608 A | 12/1985 |
| --- | --- | --- |
| WO | WO-2002050465 A1 | 6/2002 |
| WO | WO-2010/123433 A1 | 10/2010 |

* cited by examiner

FLANGE PIPE COUPLING

FIELD OF THE INVENTION

The present invention relates to apparatus and method for clamping a joint. In a particular embodiment of the invention, the joint is a flanged joint, and the apparatus and method of the invention relates to a clamp that is applied across the flanges. Typically the flanged joint being repaired is secured by bolts, which pass through opposing flanges on opposite sides of the joint, and which typically compress a gasket or other seal between the inner faces of the flanges. In certain embodiments of the invention, the apparatus and method permit clamping of the flanged joint without removal of the existing bolts or other fixings, and without disturbing the existing gasket compressed between the inner (facing) flange faces.

BACKGROUND

Flanged connections are well known. Flanged connections are used to connect lengths of pipe. Typically a flange extends radially (i.e. perpendicularly away from axis of the pipe) at each end of each pipe section to be connected, so that the flanges on each end are parallel to one another. Normally each flange has apertures extending axially (i.e. parallel to the axis of the pipe) through the flanges to permit fixings such as bolts or threaded studs to be inserted through the flanges so that the flanges can be compressed together to seal the two ends of the pipe to one another. Typically, a resilient gasket seal is compressed between the opposing faces of the flanges, and can often be held in an annular groove in one or both of the faces of the flange.

This is a satisfactory method of connecting pipe ends, and many miles of pipelines and flow lines from many industries are connected in this manner. Pipelines and their connections are of course subject to degradation over time and flanged pipeline connections such as are described above typically suffer from bolt failure before the flanges and the gaskets reach the end of their usable lives. Therefore, remedial work on flanged pipeline connections frequently involves changing out existing bolts that have corroded. Often, removal of a bolt from a flanged pipe connection requires interruption of the flow through the pipe, which can have significant adverse economic consequences in the case of oil pipelines and other high value fluid transfer pipelines. Therefore, the industry has adopted various "hot bolting" methods where individual bolts or threaded studs are removed and replaced one at a time, while the pipeline remains an active fluid conduit with fluids passing through the connection being repaired. However, this can sometimes have significant challenges, as some bolts can easily be extracted from the flanged connection and replaced relatively quickly, whereas other bolts have corroded too much to be unscrewed, and need to be split or cut from the flanged connection. Removing excessively corroded bolts increases the time involved, and also risks disturbing the connection through the high forces applied to the bolts in order to try to free them.

SUMMARY

According to the present invention there is provided a flange clamping apparatus for supporting a flanged connection between two pipes, the clamping apparatus comprising:
first and second clamp devices adapted to be applied to circumferentially spaced portions of the flanges, each of the first and second clamp devices having a foot portion adapted to engage an outer face of a flange, and a force driver device adapted to press the flanges together from opposite sides of the flanged connection.

The invention also provides a method of supporting a flanged connection between two pipes, the method comprising:

clamping first and second clamp devices across the flanged connection, at circumferentially spaced portions of the flanges, engaging the outer face of each flange with foot portions on each of the first and second clamp devices, and driving the first and second clamp devices to press the flanges together from opposite sides of the flanged connection.

Typically the first and second clamp devices each have a leg portion bearing the foot portion. The foot portion can be a separate part of the leg or an integral part of the leg. The foot portion can extend from the leg.

Typically the pipes have an axis and the flanges extend perpendicularly with respect to the axis of the pipes, which is typically aligned with the axis of the connection. Typically the clamp devices are applied across the flanges, with one part of each clamp device (e.g. the foot portion) bearing on opposing flanges and forcing them together.

The force driver device can be a tensioning device such as a threaded fixing driven through a socket. Optionally the socket can be threaded or a nut or other cooperating fixing can be used to react against the threaded fixing. Alternatively or additionally hydraulic cylinders can be used and the driver device can be used to pull or push the flanges together.

Typically the leg has a collar with a bore extending axially in parallel to the axis of the connection, and typically radially spaced in relation to the axis of the connection, allowing the collar to receive and retain a fixing such as a bolt or threaded stud or the like. Typically a nut is threaded onto the bolt or stud on the other side of the flanged connection, and the threaded action of the nut on the stud or bolt typically provides the axial force to press the two flanges together. Typically the bore of the collar is radially spaced from the axis of the connection, so that the bolt or stud passes outside the flanges, without engaging them. The collar can be an integral part of the leg or can be a separate part.

Typically the leg comprises a lever. Typically the leg has a fulcrum portion to engage against the pipe so that pivotal movement of the leg about the fulcrum portion applies axial force to the foot portion thereby compressing the flanged connection. The fulcrum portion can optionally comprise a heel on the foot, at the end of the foot that is closest to the axis of the connection.

Typically the leg portion extends axially away from the flange and optionally has a head with a lip which extends radially outward from the head. The head is typically located at one end of the leg, and typically the foot portion is located at the opposite end of the leg. Typically the head is spaced axially away from the flange, optionally in a direction that is generally parallel to the axis of the pipe connection.

Typically the foot portion, the fulcrum portion and the head are radially spaced at different intervals away from the axis of the connection, and in one embodiment the leg can adopt a generally dog leg or general "S" or "Z" form. Typically the foot portion engages the flange at a position on the flange that is radially spaced away from the wall of the pipe. The fulcrum portion typically extends radially inwardly towards the axis of the connection to bear against the pipe.

In certain embodiments, the head is typically spaced radially away from the wall of the pipe, optionally allowing the leg to be pressed radially inwards towards the wall of the pipe to pivot the leg around the fulcrum and press the foot portion axially onto the flange. Typically the head is pressed radially inwards towards the axis of the connection by a band that is wrapped around the head, and tensioned to pull the head radially inwards towards the axis of the connection. The lip typically extends radially outwards from the head to retain the band on the head.

Typically the flanged connection is a bolted connection, with bolts or threaded studs etc passing through the flanges, and typically the foot portion is adapted to engage the outer face of each flange between the bolts. Typically the foot portions allow transmission of forces to the flanges without applying forces to the bolts, or the nuts or other fixings attached thereto.

Typically the band can comprise tensioner devices (e.g. screw thread devices) to tension the band by reducing the circumference of the band when it is in position on the head.

In certain embodiments of the invention, the force driver device can be a tensioning device. Optionally the force driver can be located between two clamp bodies of each clamping device. The two clamp bodies are typically spaced apart along the axis of the clamp device, and the force driver device can be located between them, operating to pull or push the clamp bodies towards one another. In certain embodiments the force driver device is tensioned in an axial direction with respect to the connection and the pipes. Typically the force driver device is arranged on the clamping device to be parallel to the existing bolts connecting the flanges, and typically applies force in the same direction as the existing bolts or fixings that connect the flanges. Typically the direction is axial with respect to the pipe.

In certain embodiments the force driver can be located at the head of the device, and can optionally comprise only a tensioning device that is applied around the head to move it and the leg as a lever to apply the force to the flanges. Optionally the clamp bodies can be pivotally connected to pinch the flanges between the feet as the lever arms of the bodies move to compress the flanges.

In certain embodiments of the invention, more than two clamping devices are provided, typically in even numbers, but in certain embodiments an odd number of clamping devices greater than two can be provided, and typically the clamping devices are equi-distantly spaced around the circumference of the flange. Spacing the clamping devices at equal distances around the circumference of the flange to be clamped equalises the compression around the flange. Typically, clamping devices are applied on either side of each bolt passing through the flanges, and typically at the central position between adjacent bolts. Typically the apparatus permits the position of the foot against the outer face of the flange to be adjusted, optionally at the mid point between adjacent bolts.

Typically each clamping device has a leg portion, a foot portion and a head at each end of the clamping device, and in certain embodiments can have a collar. Typically the bores of the collars are aligned with one another, and are connected by means of the threaded stud or bolt etc.

Typically the clamping devices are connected with nuts or other fixings applied to the threaded studs or bolts, etc. to loosely connect the upper and lower legs of the clamping device together before the clamping device is applied across the flange. After the clamping device is applied across the flange, the nuts can be tensioned at one or both ends of the stud in order to move the legs of the clamping device together and engage the outer faces of the flange on each side of the connection. When the clamping device is made up in this way with the stud interconnecting the collars, the upper and lower legs are typically a mirror image of one another, and the foot portions and heads of the upper and lower legs are typically in radial alignment with one another, typically with the heel or fulcrum portion radially disposed between the bore of the collar and the head portion.

When the foot portion has been positioned against the flange on each side of the connection, in between adjacent bolts, and the nuts on the threaded stud have been tensioned in order to loosely clamp each clamp device in place across the flanged connection, this process is repeated until the required number of clamp devices have been applied across the flanged connection. Typically, as many clamp devices as possible will be applied across the flanged connection to be repaired, since this permits the clamping apparatus of the invention to apply a generally even clamping force circumferentially around the flanges. Optionally, it will be sufficient for one clamping device to be applied in between each adjacent pair of bolts.

Once the required number of clamping devices have been applied across the flanged connection, a tensioning band is typically fitted around the head of each clamping device and tensioned to retain the clamping devices in position and also to allow fine adjustment of the clamping force. The lip on the upper surface of the head of each clamping device serves to retain the tensioning band in position on the head of each clamping device. Optionally, the tensioning band can incorporate adjuster screws such as grub screws or the like to apply separate tensioning force on each head in order to adjust the tension at each part of the flange.

The primary tensioning force across the flange is typically applied by tensioning the studs, and resisting movement of the heads of the clamping devices away from the wall of the pipe by means of the tensioning band. In general, the tension in the threaded studs is increased while measuring the tension in the existing bolts that pass through the flange being repaired. The tension in the threaded studs bypassing the flange is increased until the tension in the bolt passing through the flange approaches zero, at which time, the threaded stud is applying the same tension to the flange that was previously applied by the existing bolt, which is therefore redundant. By applying the same tension via the threaded studs on the clamping device of the invention as was previously applied by the existing bolts that passed through the flanges, the remedial method according to the invention avoids changing the internal conditions on the inner faces of the flange, and thereby avoids disturbing the seal as much as possible, thereby reducing the extent of the intervention. The clamping force applied across the flanged connection is therefore gradually increased until the force compressing the flanges is the same as it was before intervention, but instead of being applied through the existing bolts, it is being applied through the clamping device of the invention. In this way, structurally intact threaded studs and other components of the invention which are applied to an older failing flanged connection can be certified for use for a further period of time to coincide with or extend beyond the expected lifetime of the flanged connection and the pipeline itself, without disturbing the existing bolts. These can optionally be left in place if desired, as they no longer apply any force, or can optionally be removed according to operator preference.

Optionally the force applied by each clamping device to the flange can be adjusted independently of other clamp devices attached to the flange. This can optionally be done by tensioning the main bolt or threaded stud extending axially between the clamp bodies. Optionally the tension can be adjusted independently on each side of the flanged connection. Optionally the force applied at each clamp body can be adjusted independently of the other clamp bodies. This can be done by applying differential tension to the leg portion. Different adjustment devices can be provided in each embodiment allowing tensioning of all clamping devices together and/or tensioning of each individual clamping device independently of other clamping devices (optionally with different tension on opposite sides of the flanged connection), and/or tensioning of each individual clamp body independently of other clamp bodies. More than one adjustment device can be provided on a single clamp device to apply different tension independently to different parts of the clamp device.

Typically the adjustment device can comprise a screw threaded bolt or stud having a head that can be turned by a spanner or other driver, typically allowing adjustment of the tension after the clamping device has been applied to the flanges.

In certain embodiments, the leg can incorporate a pivot axis comprising a pivot pin connecting two parts of the leg, wherein the pin is set in an axis perpendicular to the axis of the pipes, and allowing the two parts of the leg on either side of the pivot axis to move pivotally relative to one another. Optionally a screw threaded adjuster device or similar can be connected across the pivot axis in the leg to adjust and optionally set the pivot angle around the pivot axis in a desired configuration. By adjusting the screw thread on the adjuster screw, the distal end of the leg furthest away from the flanges can be raised or lowered away from and towards the axis of the pipes, so as to increase or decrease the force applied locally to that particular leg. Therefore, the force applied to one particular leg can be increased or decreased more than the tension on the other legs in the arrangement, in order to increase or decrease local compressive force applied to the flanges at a particular circumferential location on a flange. The adjuster screw can be adjusted before or after the tensioning band is applied to the legs and tensioned.

Optionally tensioning devices can be provided in or on the leg.

In some cases, the tensioning device acts on the band. In one such device, the tensioning device comprises a bracket carried on the distal end of the leg, and movable radially in relation to the axis of the pipes, and having an adjuster screw passing through the bracket and through the leg, with a head of the screw facing radially outward from the leg allowing the screw to be driven in order to move the bracket radially towards and away from the pipe, perpendicularly to the axis. The bracket typically carries a slot or the like to receive the band, so that adjusting the screw moves the bracket radially and therefore causes the slot to move radially also, thereby moving the path of the band towards and away from the pipe surface, and adjusting the tension applied to that particular leg and therefore the axial force applied to the flange by the foot on the leg.

Optionally the tensioning device incorporates a wedge device driven between two of the components of the clamp device in order to change the relative positions of the two components, and therefore increase or decrease the distance between them, thereby adjusting the tension in the clamp device. The wedge device can optionally be driven by an adjuster screw, typically restrained in or on a part of the clamp body. Optionally the wedge device can be driven perpendicularly between the clamp body and a part of the bolt axially connecting two clamp bodies across the flanged connection, and can optionally be restrained at the collar. Optionally the wedge device can be driven perpendicularly between the clamp body and the adjuster screw on the tensioning device at the distal end of the leg, and the adjuster screw for driving the wedge device can optionally be restrained on the leg near to the adjuster screw for tensioning the band or other tensioning device.

Optionally the wedge device can be driven by an adjuster screw that is housed within a bore made up of more than one component. The bore housing the adjuster screw can optionally be only partially threaded, for example threaded on only one side, and the threads can optionally be formed on only one of the components. In one embodiment, the bore can optionally comprise a matching pair of recesses on facing walls of the collar and the wedge device. The recess on the wall of the collar can be threaded, and optionally the recess on the wall of the wedge device can be plain. Typically the recess on the wall of the wedge device can have a radial protrusion extending into the bore to be driven by a portion of the screw adjuster (e.g. the end of the screw adjuster) so that the axial movement of the screw adjuster in the bore drives the protrusion along the bore. As the half of the bore on the wedge device is plain and unthreaded, the screw adjuster slides on the unthreaded wall of the recess in the wedge device, and moves the wedge device along the axis of the bore.

The different tensioning devices and their adjusters can optionally be combined in a single embodiment, so that one embodiment might have a number of different tensioning options.

Optionally the apparatus can incorporate a mechanism to control the force applied by the force driver device, for example, controlling the tension in the axial bolts connecting the clamp bodies across the flanges. These can optionally be provided with tension measuring, controlling and/or indicating devices indicating and/or controlling the tension applied to a bolt. Optionally the mechanism can indicate the tension in a readable scale, but in some simpler embodiments, the desired tension can be pre-set before tensioning the bolt, and the bolt can then typically be tensioned up to that level without any reading of the tension until the pre-set tension is reached. Suitable tension controllers are described in U.S. Pat. No. 4,636,120 and U.S. Pat. No. 5,226,765, the contents of which are incorporated by reference, but other tension gauges and indicators can be used instead.

BRIEF DESCRIPTION OF THE DRAWINGS

An embodiment of the invention will now be described, by way of example, with reference to the accompanying drawings, in which:—

DETAILED DESCRIPTION

Figure 1:
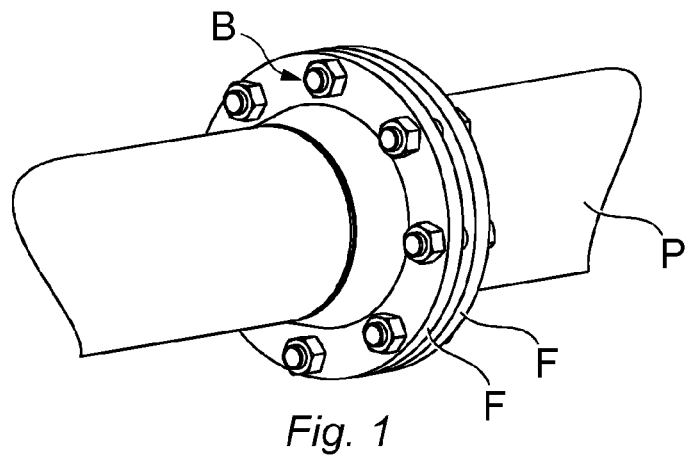
FIG. 1 shows a flanged connection secured by bolts which are nearing the end of their serviceable life.

Referring now to the drawings, FIG. 1 shows a pipeline P having a flanged connection comprising a pair of flanges F which are interconnected by bolts B passing through axial holes in the flanges F so that the bolts B are parallel to but radially spaced from the axis of the pipe P. The bolts B are typically arranged at equal distances around the circumference of the flanges, so as to equalise the clamping pressure they apply. The flanges F have outer faces which are engaged by nuts, and inner faces which typically can have a groove for retaining a gasket adapted to seal the connection.

Figure 2:
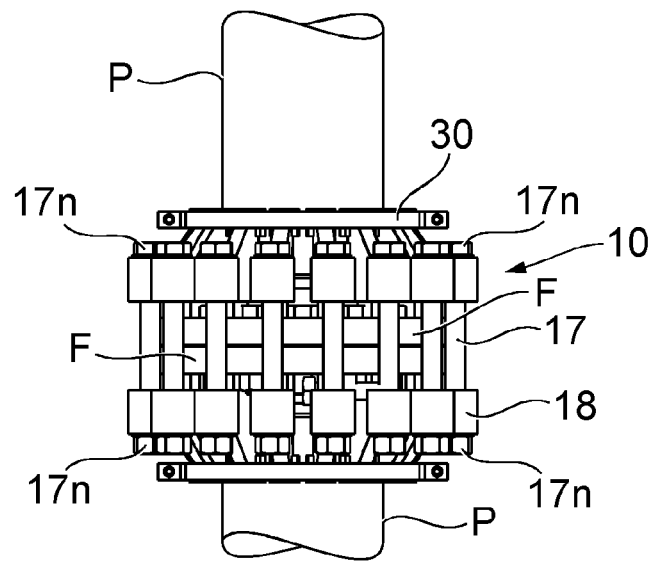
FIG. 2 shows a side view of a clamping apparatus in accordance with one embodiment applied around the flanged connection shown in FIG. 1.

When the bolts B have been corroded to an extent that requires their replacement, the clamping apparatus shown in FIG. 2 is applied around the flanges F by the following method.

Figure 6:
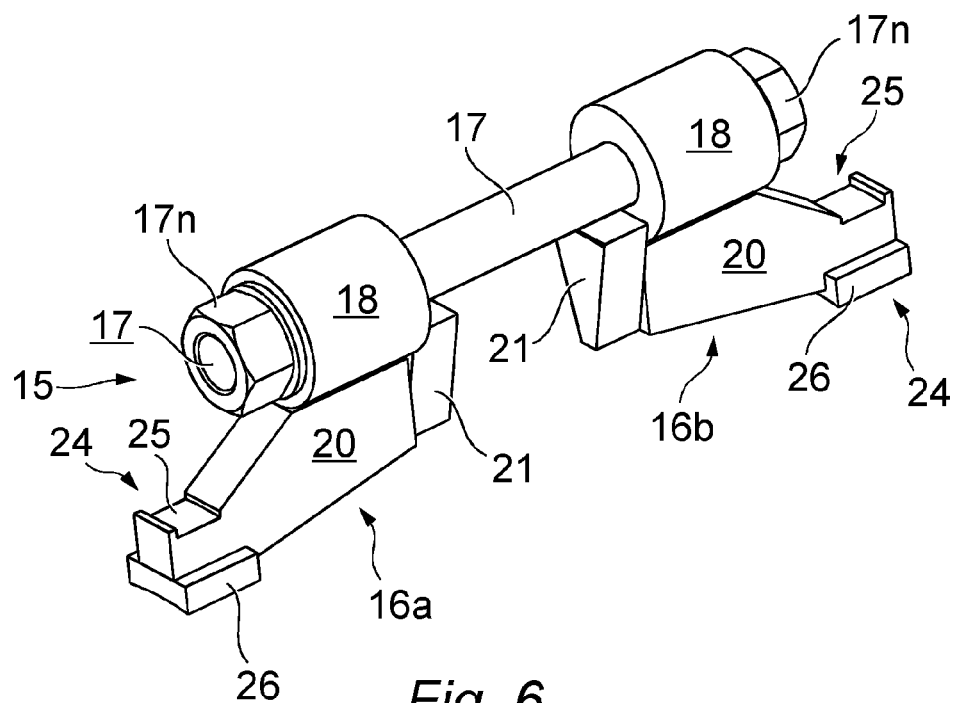
FIG. 6 shows a clamping device used in the FIG. 2 embodiment.

The clamping device 10 comprises a number of individual clamping devices in the form of clamp members 15 shown in FIG. 6. Each clamp member 15 comprises an upper and lower clamp body 16a, 16b, which are mirror images of one another typically and are typically interconnected by a threaded shaft or stud 17. Threaded stud 17 passes through a bore in a collar portion 18 on each body 16. The bores on the collars 18 are aligned, so that the clamp member is symmetrical around the central point of the stud 17. The collars 18 are welded to legs 20. The legs 20 extend radially away from the axis of the threaded stud 17, typically at a divergent angle, so that the leg forms a general "S" shape. The inner end of the leg 20 typically has a foot portion 21 which is welded to the opposing inner faces of the collar 18 and the foot 20. Typically the outer divergent end of the leg 20 has a head 24 which is radially and axially spaced away from the stud 17. Typically distance between the stud 17 and the head 24 is larger than the distance between the stud 17 and the foot 21. The ends of the stud 17 extending axially beyond the collars 18 are capped with a nut 17n in order to drive the clamp bodies 16 towards one another when the nuts 17n are tightened.

The head 24 on each of the clamp bodies 16 has an inner face and an outer face. The outer face has a track 25, and the inner face has a pad 26, the function of which will be described below.

Figure 3:
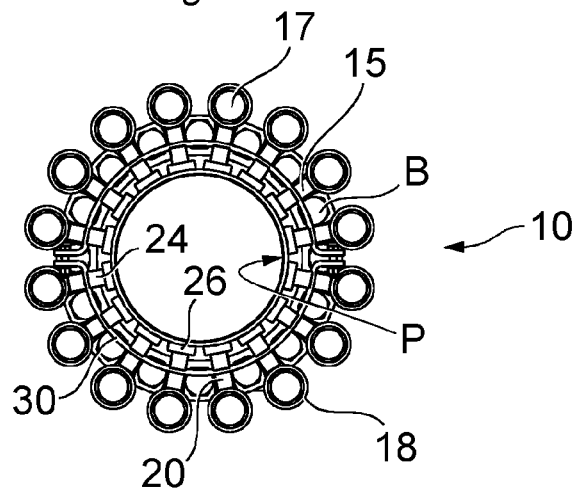
FIG. 3 shows a plan view of the FIG. 2 embodiment.
Figure 4:
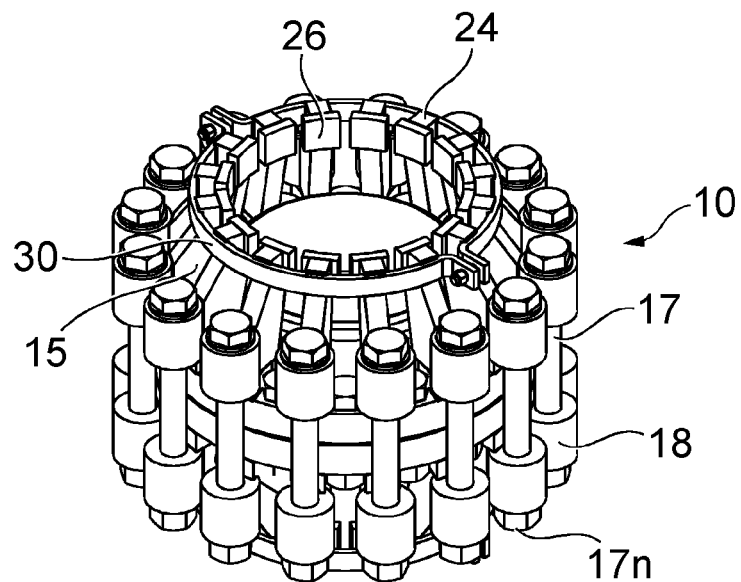
FIG. 4 shows a perspective view of the FIG. 2 embodiment with the pipe wall removed for clarity.
Figure 5:
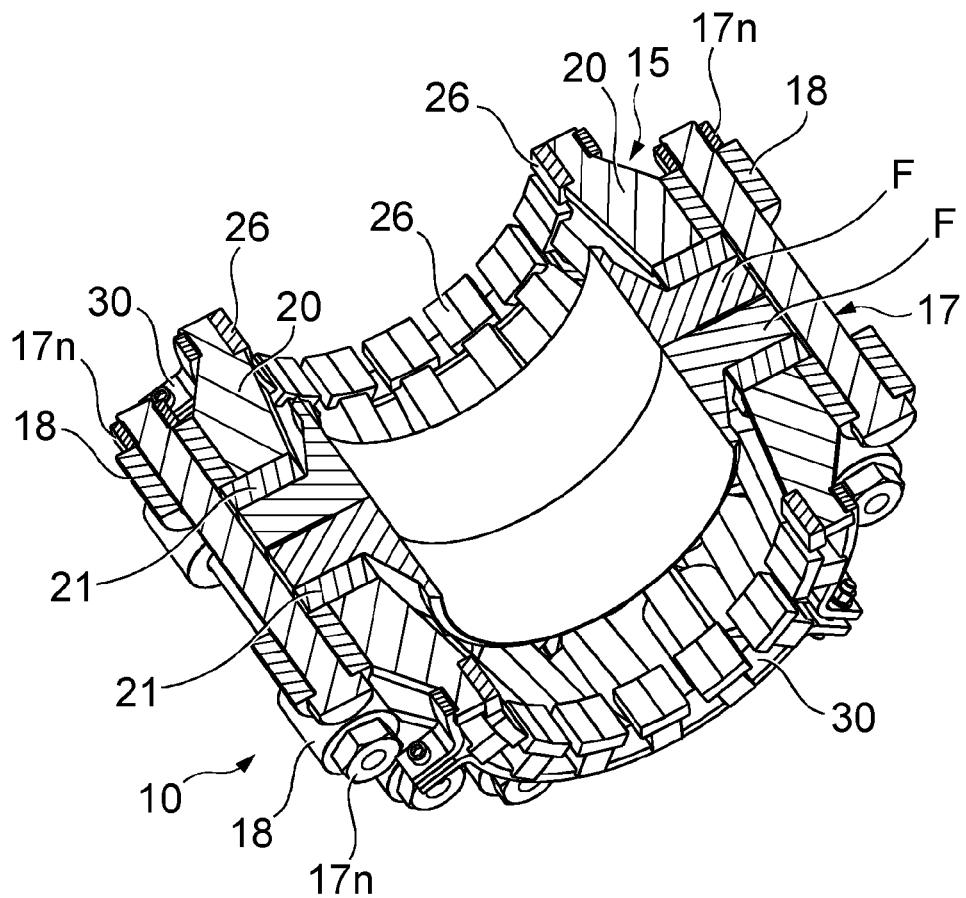
FIG. 5 shows a sectional view through the FIG. 2 embodiment.

The clamping apparatus 10 is assembled around the flanges F as follows. Initially, a clamp member is placed typically equi-distantly between adjacent bolts B as generally shown in FIG. 3. The foot 21 of each clamp body 16 has a narrowed inner heel, which is placed radially inward on the flange, closest to the wall of the pipe P. As is best shown in FIG. 5, the narrowed inner end of the heel of the foot 21 can typically pass into the narrow space between the bolts B that extend through the flange, and does not interfere with the bolt B or the nuts on the ends of them. Once the heel of each foot 21 is disposed in approximately the mid point between adjacent bolts B on the flanges F, the nuts 17n on the stud 17 are adjusted to assemble and retain the clamp member 15 across the flanged connection. This process is repeated with additional clamp members 15 until each adjacent pair of bolts has a clamp member 15 disposed between them, as shown in FIGS. 2, 3 and 4. Note that in some embodiments of the invention, it is not necessary for each bolt B to be flanked by a pair of clamp members 15 as is shown in the drawings, but this arrangement maximises the surface area that is clamped, and equalises the clamping force applied around the flange. When clamp bodies 15 have been applied across the flange and loosely tensioned so as to remain in place, the head of each clamp body 16 is secured against movement relative to the wall of the pipe P by applying a tensioning band 30 to the tracks 25 on the outer surfaces of the heads 24. Applying tensioning force to the tensioning bands 30 on either side of the flanged connection forces the pads 26 located on the inner surface of the heads 24 towards the outer wall of the pipe P. At this stage, the clamp members are typically fixed in position and can be tensioned. Before final tensioning of the clamp members 15, the circumferential position on the flange can be adjusted in order to equalise the force applied around the flange. Once correctly positioned, each stud 17 can be tensioned by tightening the nuts 17n to draw the clamp bodies 16 axially towards one another compress the flanges F together.

While the tension is being applied across the clamp members 15, typically the tension in the existing bolts B can be measured by known tension measurement devices and monitored as the tension is increased through the clamp members 15 until the tension in the existing bolts B approaches zero. At this point, when it can be determined that the existing bolt B is no longer holding any of the axial load across the flanges F, the stud 17 is left at that tension in order to avoid changing the local force applied across the flange at that particular bolt. This process is repeated around the flange, with the result that the load experienced by the flange before and after the application of the clamping apparatus is generally the same as it was before intervention, and the internal conditions of the seal at the inner faces of the flanges F are not disturbed by the remedial operations.

Once the axial load across the flanges F is transferred completely to the clamping apparatus of the invention, the existing bolts B can be removed or alternatively can be left in place according to operator preference, but significantly, as they are not bearing any of the load across the flanged connection, their further degradation and subsequent failure due to corrosion or other factors will have substantially no effect on the integrity of the connection.

In some modified embodiments of the invention, the individual tension applied to each clamping device 15 can be modified by providing adjustment devices between the heads 24 and tensioning band 30. In one such embodiment, a grub screw can be provided in a threaded aperture extending radially through the tensioning band. In certain embodiments, the plate 26 on the inner face of the head 24 need not be pressed fully against the outer wall of the pipeline P although this remains an option in other embodiments. In such embodiments, the grub screw extending through the threaded aperture in the tensioning band can press the head 24 on one of the clamping devices 15 radially inwards relative to its neighbours, thereby applying additional tension by means of the lever arm created by the relative positions of the head 24, the foot 21, and the collar 18.

Figure 7:
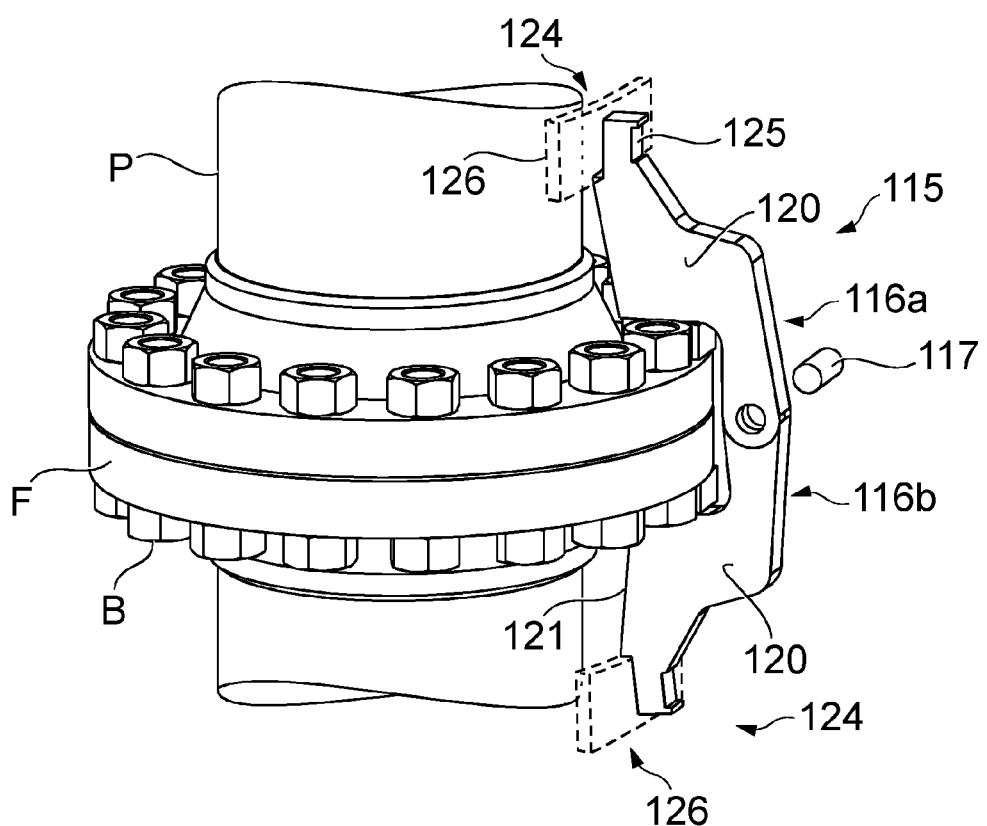
FIG. 7 shows a further embodiment of a clamping device for use in the invention.

Referring now to FIG. 7, the same pipeline P and flanged connection with flanges F and bolts B is being repaired by an alternative embodiment of the invention. In this embodiment, similar components to those described in relation to the first embodiment have similar reference numbers prefaced by "1". In the second embodiment of the clamping device there are similarly a number of individual clamping devices in the form of clamp members 115 shown in FIG. 7. Each clamp member 115 comprises an upper and lower clamp body 116a, 116b, which are mirror images of one another typically and are interconnected by pivot shaft 117 about which the clamp bodies 116 can pivot. The clamp member 115 is symmetrical around the central point of the shaft 117. The legs 120 extend in a general "S" shape. The inner end of each leg 120 typically has a foot portion 121 which is optionally formed as an integral part of the opposing inner faces of the legs 120. Typically the outer divergent ends of the legs 120 have a head 124 which is radially and axially spaced away from the shaft 117. Pivotal movement of the clamp bodies 116 around the shaft 117 causes the feet 121 to move axially towards and away from one another, as the legs 120 act as levers.

The heads 124 on each of the clamp bodies 116 has an inner face and an outer face. The outer face has a track 125, and the inner face optionally has a pad 126, similar to the first embodiment.

The clamping apparatus of the second embodiment is assembled around the flanges F as follows. Initially, a clamp member 116 is placed typically equi-distantly between adjacent bolts B as previously described. The foot 121 of each clamp body 116 optionally has a narrowed inner heel, which is placed radially inward on the flange, closest to the wall of the pipe P, and is adjusted to press on the flanges F at the mid point between adjacent bolts B on the flanges F. When clamp bodies 115 have been applied across the flange between each or some of the bolts B and loosely held so as to remain in place, the head of each clamp body 116 is secured against movement relative to the wall of the pipe P by applying a tensioning band to the tracks 125 on the outer surfaces of the heads 124 as previously described. Applying tensioning force to the tensioning bands on one or both sides of the flanged connection forces the pads 126 located on the inner surface of the heads 124 towards the outer wall of the pipe P. This pivots the clamp bodies 116 around the shaft 117 thereby pinching the flanges F between the feet 121, which move axially towards one another compressing the flanges together. At this stage, the clamp members are typically fixed in position are forcing the flanges towards one another. Before final tensioning of the clamp members 115, the circumferential position on the flange F can be adjusted in order to equalise the force applied around the flange. Once correctly positioned, the tensioning bands can be tensioned to pivot the feet 121 on each of the clamp bodies 116 towards one another compress the flanges F together.

While the tension is being applied across the clamp members 115, typically the tension in the existing bolts B can be measured by known tension measurement devices and monitored as the tension is increased through the clamp members 115 until the tension in the existing bolts B approaches zero. At this point, when it can be determined that the existing bolt B is no longer holding any of the axial load across the flanges F, the clamp bodies 115 is left at that tension. The local axial forces across the flanges F at each individual clamp body can be adjusted by means of a grub screw as previously described in order to change the levered force applied by each individual clamp body 115. This avoids changing the local force applied across the flange at each particular bolt. This process is repeated around the flange, with the result that the load experienced by the flange before and after the application of the clamping apparatus is generally the same as it was before intervention, and the internal conditions of the seal at the inner faces of the flanges F are not disturbed by the remedial operations.

Once the axial load across the flanges F is transferred completely to the clamping apparatus of the invention, the existing bolts B can be removed or alternatively can be left in place according to operator preference, but significantly, as they are not bearing any of the load across the flanged connection, their further degradation and subsequent failure due to corrosion or other factors will have substantially no effect on the integrity of the connection.

In certain embodiments, the plate 126 on the inner face of the head 124 need not be pressed fully against the outer wall of the pipeline P although this remains an option in other embodiments. In some embodiments the plate 126 is optional.

Modifications and improvements can be incorporated without departing from the scope of the invention.

In certain embodiments, the leg, collar, and foot can be initially formed from separate items and welded or otherwise connected together. Alternatively, the clamping devices 15 can optionally be formed as a single cast item in one piece. Typically, the components of the present apparatus and formed from corrosion resistant materials, such as high tensile steel, typically alloyed with certain anti-corrosion elements.

Alternative clamping bodies are shown in FIGS. 8-14, which can be used with any embodiments of the invention described herein, either alone or in combination with one another. In the modified clamp bodies of FIGS. 8-14, each clamping device can typically be tensioned independently of other clamp devices attached to the flange.

Optionally tensioning devices can be provided in or on the leg. In one such example, shown in FIG. 8, similar components to those described in relation to the first embodiment have similar reference numbers prefaced by "2". In this embodiment of the clamping device there are a number of individual clamping devices in the form of clamp members 215 comprising an upper and lower clamp body 216a, 216b interconnected by a threaded stud 217 extending through collars 218 as with the first embodiment. The inner end of each clamp body 216 typically has a foot portion 221, and the outer divergent ends of the bodies 216 have a head 224. A pivot pin 214 connects inner and outer parts of the bodies 216. Pivotal movement of the inner and outer parts of the clamp bodies 216 around the pivot pin 214 causes heads 224 to move radially in relation to the axis of the pipe. The heads 224 on each of the clamp bodies 216 have a track 225, similar to the first embodiment.

A screw adjuster 222 is connected across the pivot joint between the inner and outer parts of the clamp bodies. The screw adjuster can be operated to move the inner and outer parts of the clamp bodies pivotally in relation to one another, around the pivot joint.

The clamping apparatus of this embodiment is assembled around the flanges F as previously described. Applying tensioning force to the tensioning bands on one or both sides of the flanged connection forces the heads 224 towards the outer wall of the pipe P thereby pinching the flanges F between the feet 221, which move axially towards one another compressing the flanges together. The tension can be adjusted on each clamp body by means of the screw adjuster (independently on each side of the flanged connection and independently of the other clamp bodies). Typically the screw adjuster has an exposed head that can be turned by a spanner or other driver, typically allowing adjustment of the tension after the clamping device has been applied to the flanges. By adjusting the screw thread on the adjuster screw, the distal end of the leg furthest away from the flanges can be raised or lowered away from and towards the axis of the pipes, so as to increase or decrease the tension applied locally to that particular leg by the tensioning band acting on the head. Therefore, the tension applied to one particular leg can be increased or decreased more than the tension on the other adjacent or distant legs in the arrangement, in order to increase or decrease local compressive force applied to the flanges at a particular circumferential location on the flange. The adjuster screw can be adjusted before or after the tensioning band is applied to the legs and tensioned.

In some cases, the tensioning device acts on the band. In one such example, shown in FIG. 9, similar components to those described in relation to the first embodiment have similar reference numbers prefaced by "3". In this embodiment of the clamping device there are a number of individual clamping devices in the form of clamp members 315 comprising an upper and lower clamp body 316a, 316b interconnected by a threaded stud 317 extending through collars 318 as with the first embodiment. The inner end of each clamp body 316 typically has a foot portion 321, and the outer divergent ends of the bodies 316 have a head 324. The clamp bodies 316 pivot around the foot 321 in a similar manner to the first embodiment, so that the heads 324 move radially in relation to the axis of the pipe and the feet 321 press axially on the outer surfaces of the flanges.

The heads 324 on each of the clamp bodies 316 have a bracket 325 with a slot to receive the tensioning band 30. The bracket 325 can move within the head 324 radially with respect to the axis of the pipes in the direction of the arrows in FIG. 9, to adjust the tension on the band passing through the slot in the bracket 325. The bracket 325 is moved radially by an adjuster screw 323 passing through the head 324 and into the bracket, where it is optionally held captive. Screwing the adjustment screw moves the bracket radially to change the line of the tensioning band 30 and thereby adjusts the tension on the clamp body 316, typically independently of other clamp bodies, and typically on only one side of the flange.

The clamping apparatus of this embodiment is assembled around the flanges F as previously described. Applying tensioning force to the tensioning band 30 on one or both sides of the flanged connection forces the heads 324 towards the outer wall of the pipe P thereby pinching the flanges F between the feet 321, which move axially towards one another compressing the flanges together. The tension can be adjusted on each clamp body by means of the screw adjuster 323 (optionally independently on each side of the flanged connection and independently of the other clamp bodies). Typically the screw adjuster 323 has an exposed head that can be turned by a spanner or other driver, typically allowing adjustment of the tension after the clamping device has been applied to the flanges. Therefore, the tension applied to one particular clamp body can be increased or decreased more than the tension on the other adjacent or distant legs in the arrangement, in order to increase or decrease local compressive force applied to the flanges at a particular circumferential location on the flange. The adjuster screw can be adjusted before or after the tensioning band is applied to the legs and tensioned.

Figure 10:
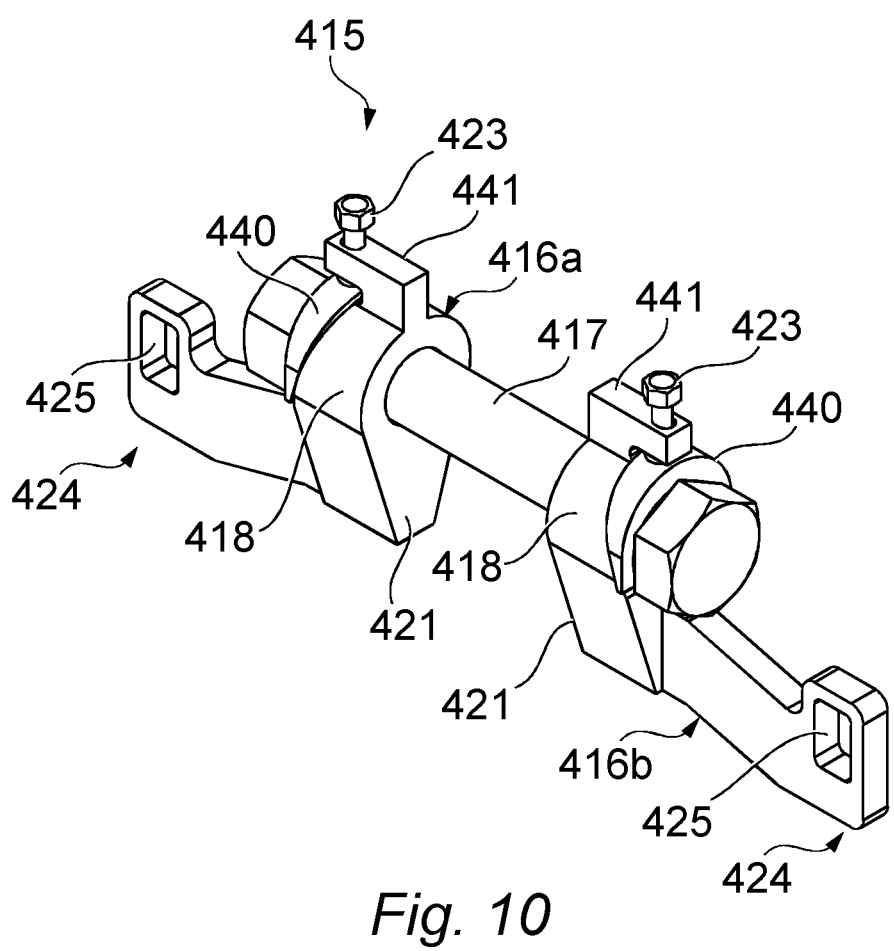

In some cases, the tensioning device can optionally incorporate a wedge device driven between two of the components of the clamp device in order to change the relative positions of the two components, and therefore increase or decrease the distance between them, thereby adjusting the tension in the clamp device. FIG. 10 shows one such embodiment, and similar components to those described in relation to the first embodiment have similar reference numbers prefaced by "4". In this embodiment of the clamping device there are a number of individual clamping devices in the form of clamp members 415 comprising an upper and lower clamp body 416a, 416b, interconnected by a threaded stud 417 extending through collars 418 as with the first embodiment. The inner end of each clamp bodies 416 typically has a foot portion 421, and the outer divergent ends of the bodies 416 have a head 424. The clamp bodies 416 pivot around the foot 421 in a similar manner to the first embodiment, so that the heads 424 move radially in relation to the axis of the pipe and the feet 421 press axially on the outer surfaces of the flanges.

The heads 424 on each of the clamp bodies 416 have a slot 425 to receive the tensioning band.

The collars 418 each typically have a wedge device 440 in the general shape of a horseshoe having arms with free ends that taper steadily (optionally linearly) from a thin rounded point to a thicker yoke connecting the arms, which typically holds captive a threaded end of a screw adjuster 423 in such a way that the screw adjuster 423 can rotate within the yoke, but the yoke stays on the end of the screw adjuster 423 when the screw rotates in the yoke. The screw adjuster 423 connects the yoke to the collar via a mounting arm 441 having a radially extending threaded bore to receive the screw adjuster 423. Rotation of the screw adjuster 423 in the bore of the mounting arm radially drives the wedge device 440 on the end of the screw adjuster, parallel to the axis of the bore in the mounting arm 441. The wedge device 440 is typically set in place between the collar 418 and the head of the threaded stud 417, with the stud 417 extending between the arms of the wedge device 440. Driving the wedge radially towards the axis of the pipes by driving the screw adjuster increases the separation between the collar 418 and the head on the threaded stud 417, and so increases the tension in the threaded stud 417. Conversely, radially retracting the wedge device 440 reduces the tension. Accordingly the tension in the stud 417 can be controlled by adjusting the screw adjuster 423, before or after fitting of the clamping device 415 to the pipes. Screwing the adjustment screw 423 adjusts the tension on the stud independently of other clamp bodies.

The screw adjuster 423 typically has an exposed head that can be turned by a spanner or other driver, typically allowing adjustment of the tension after the clamping device has been applied to the flanges.

Figure 8:
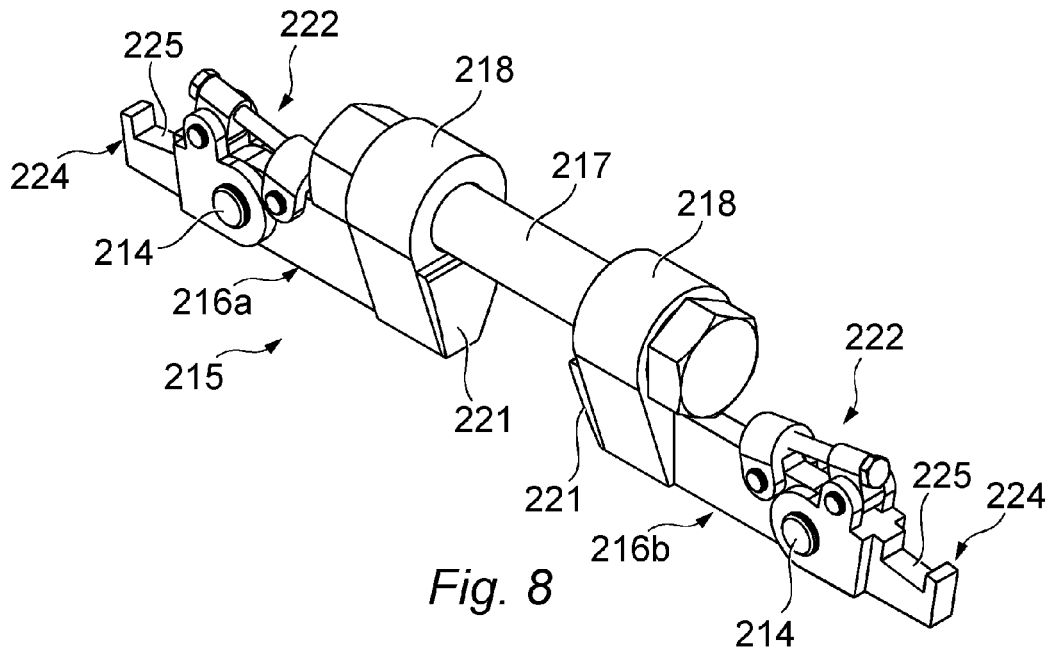
FIGS. 8, 9 and 10 respectively show perspective views of alternative designs of clamping devices suitable for use in the clamping apparatus of the invention.
Figure 9:
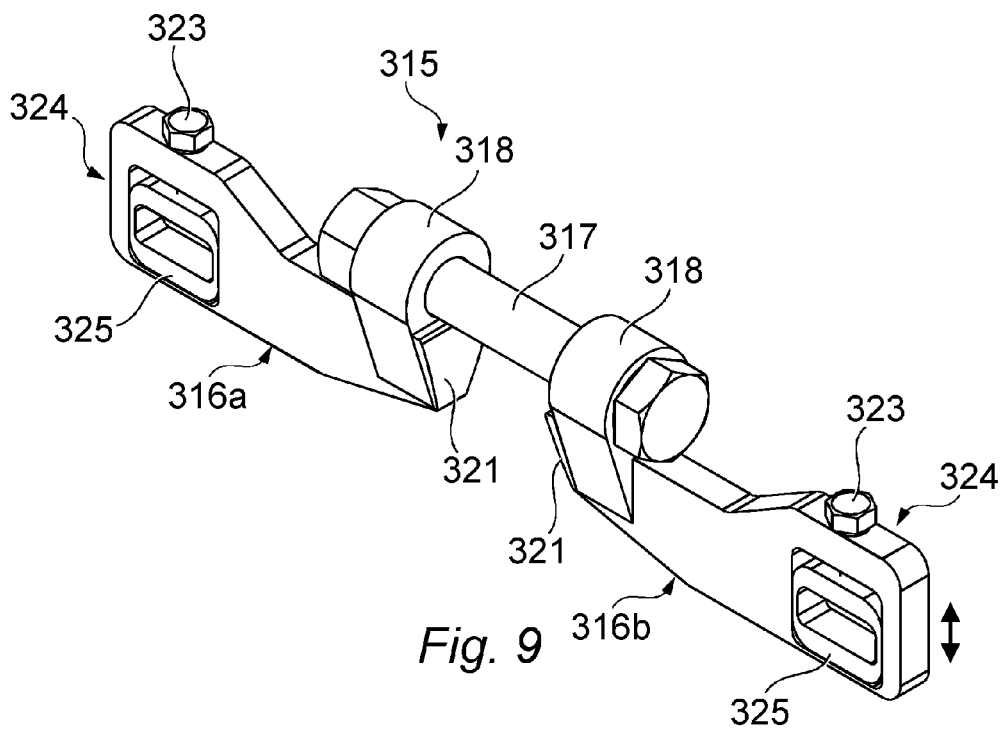

In a similar manner, the wedge device can optionally be driven between other components on different embodiments, for example, it can be used on different adjuster screws such as those described in FIGS. 8 and 9. Thus any one or more of the different tensioning devices and their adjusters can optionally be combined in a single embodiment, so that one embodiment might have a number of different tensioning options.

In the embodiment of FIGS. 11-14, the wedge device is driven between the collar of the clamp device and the nut on the stud in order to change the relative positions of the two components, and increase or decrease the distance between them, thereby adjusting the tension in the clamp device. FIGS. 11-14 all show a single embodiment, and similar components to those described in relation to the first embodiment have similar reference numbers prefaced by "5". In this embodiment of the clamping device there are a number of individual clamping devices in the form of clamp members 515 comprising an upper and lower clamp body 516a, 516b, interconnected by a threaded stud 517 extending through collars 518 as with the previous embodiment. The inner end of each clamp bodies 516 typically has a foot portion 521, and the outer divergent ends of the bodies 516 have a head 524. The clamp bodies 516 pivot around the foot 521 in a similar manner to the first embodiment, so that the heads 524 move radially in relation to the axis of the pipe and the feet 521 press axially on the outer surfaces of the flanges.

The heads 524 on each of the clamp bodies 516 have a slot 525 to receive the tensioning band.

The collars 518 each typically have a wedge device 540 in the form of an oval collar with an oval aperture for receiving the stud 517, and having an outer thick end near the top of the oval and a narrower inner end, near the bottom of the oval aperture and adjacent the inner part of the collar 518. The wedge device is moved along a sloping outer face 518f of the collar by an adjuster screw 523. In the embodiment of FIGS. 11-14, the adjuster screw 523 is housed within a bore made up of more than one component. In this embodiment, the bore housing the adjuster screw 523 is optionally only partially threaded, only one side, and the threads are optionally formed on only one of the components. In this embodiment, the bore comprises a matching pair of recesses on the opposed sloping walls of the collar 518 and the wedge device 540. The recess on the sloped outer wall 518f of the collar 518 can optionally be threaded, and optionally the recess on the opposing inner wall of the wedge device 540 can be plain. Typically the recess on the wall of the wedge device 540 can have a radial protrusion 541 extending into the bore at the lower end of the bore, to be driven by a portion of the screw adjuster 523 (e.g. the end of the screw adjuster) so that the axial movement of the screw adjuster 523 in the bore drives the protrusion 541 axially along the bore, relative to the collar 518. As the recess on the inner face of the wedge device 540 is plain and unthreaded, the screw adjuster 523 slides on the unthreaded recess in the inner wall of the wedge device 540, and drives the wedge device 540 along the axis of the bore, along the sloping outer face of the collar 518. The stud 517 remains within the oval aperture of the wedge device 540 and moves from the outer end of the aperture to the inner end, as the wedge device 540 moves down the sloped face. Because of the sloped faces of the collar 518 and the wedge device 540, driving the screw adjuster 523 to move the wedge device 540 down the outer sloped face 518f of the collar 518 moves the outer face 540f of the wedge device 540 parallel to the axis of the stud 517, thereby increasing the distance between the nuts 517n on the stud 517 and tensioning the stud 517.

Figure 11:
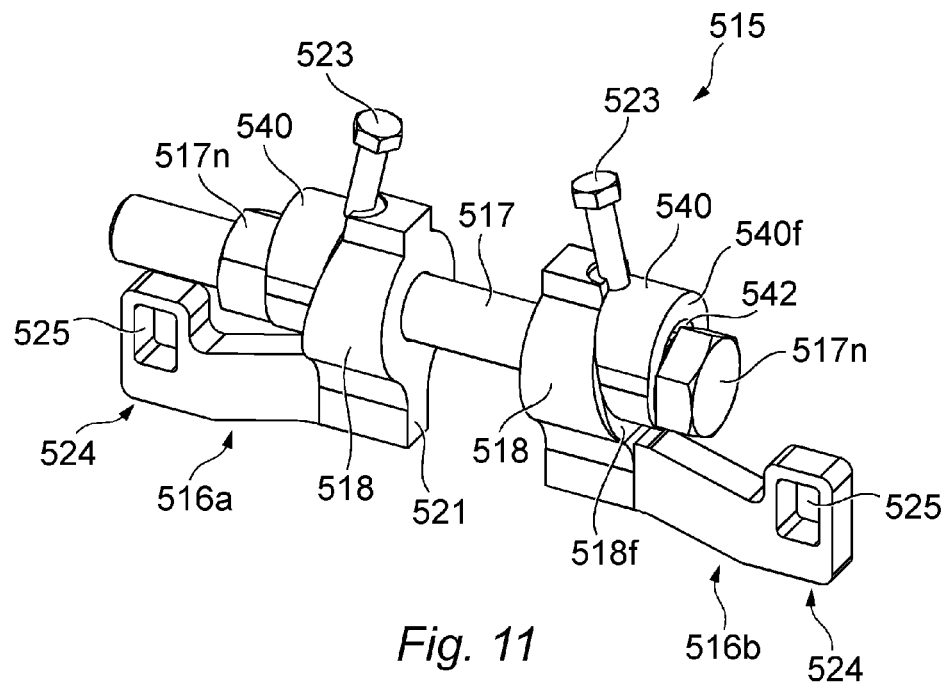
FIGS. 11 and 12 show respective perspective side and sectional views of an alternative design of clamping device in an un-tensioned configuration.
Figure 12:
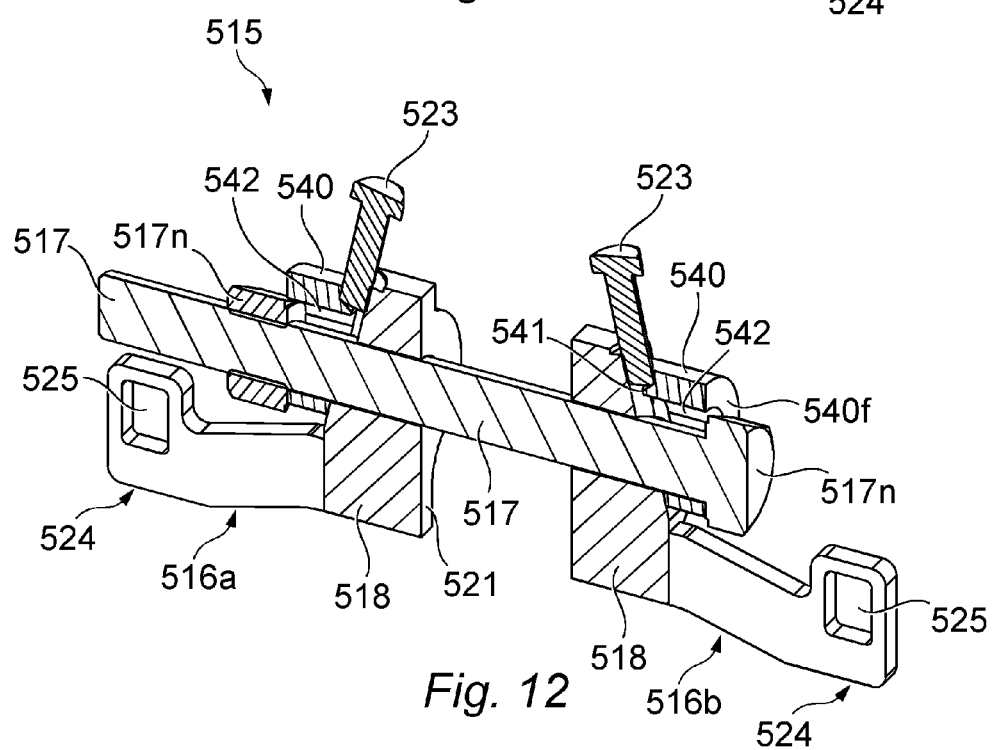
Figure 13:
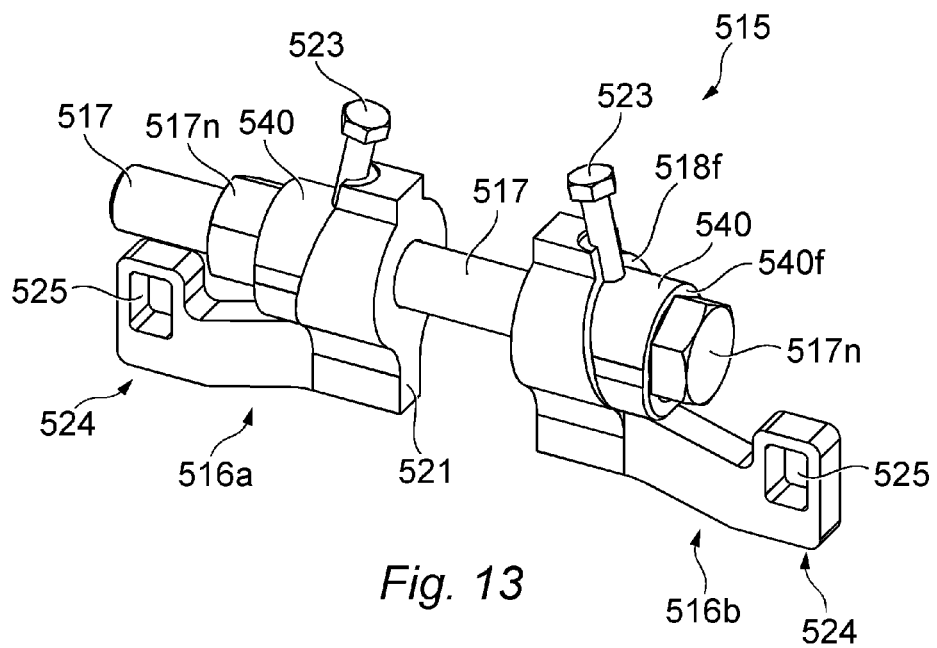
FIGS. 13 and 14 show respective perspective side and sectional views of the FIGS. 11 and 12 clamping device in a tensioned configuration.
Figure 14:
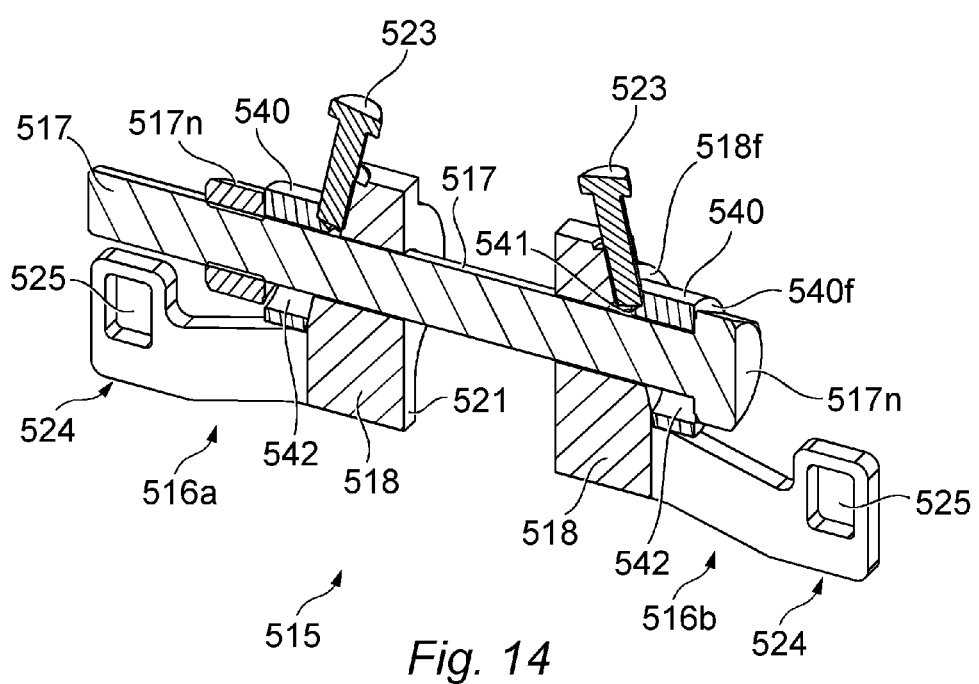

FIGS. 11 and 12 show the clamp device 515 in an untensioned configuration, in which the wedge device 540 is in an outer position, and the stud 517 is at an inner end of the oval aperture 542. FIGS. 13 and 14 show the clamp device 515 in a tensioned configuration, in which the wedge device 540 has moved down the sloped outer face of the collar 518f to rest in an inner position, nearer to the flange, and the stud 517 is at an outer end of the oval aperture 542. The movement down the slope 518f has moved the wedge device 540 with a radial and an axial component, so the outer faces of each of the wedge devices 540f has pushed the nuts 517 further away from one another in order to tension the stud.

Screwing the adjustment screw 523 therefore adjusts the tension on the stud independently of other clamp bodies. Tension can be applied or relieved by the screw 523.

The screw adjuster 523 typically has an exposed head that can be turned by a spanner or other driver, typically allowing adjustment of the tension after the clamping device has been applied to the flanges.

In a similar manner, the wedge device 540 can optionally be driven between other components on different embodiments, for example, it can be used on different adjuster screws such as those described in previous embodiments. Thus any one or more of the different tensioning devices and their adjusters can optionally be combined in a single embodiment, so that one embodiment might have a number of different tensioning options.

Optionally any of the previously described embodiments can incorporate a mechanism to control the tension in any of the bolts and/or in any of the adjusting screws, for example in the axial bolts 17 connecting the clamp bodies across the flanges. Suitable tension controllers are described in U.S. Pat. No. 4,636,120 and U.S. Pat. No. 5,226,765, the contents of which are incorporated by reference, but other tension gauges and indicators can be used instead. Typically the bolts 17 are pre-loaded to a desired tension suitable for the flange, and then tensioned in place until the controller trips the indicator to indicate to the operator that the bolt 17 has reached the required tension. Typically the gauges can be incorporated within the studs 17 in a configuration having their strain adjusters on an external surface, so that the pre-load tension can be checked, and/or adjusted after the apparatus has been put in place on a flange, for example, in a 5 year inspection. Optionally the tension in studs 17 can additionally or alternatively be measured by means of torque wrenches or the like.

More than one tensioning device can be provided on a single clamp device to apply different tension independently to different parts of the clamp device.

The invention claimed is:

1. A connection assembly comprising two pipes and a flange clamping apparatus for supporting a flanged connection between the two pipes, the connection having an axis, and the pipes having a respective flange extending radially from each pipe, away from the axis, wherein the flanges are provided with circumferentially spaced bolt holes which receive threaded fixings, the clamping apparatus comprising:
   at least first and second clamp devices adapted to be applied to circumferentially spaced portions of the flanges, each of the first and second clamp devices having a foot portion adapted to engage an outer face of a flange and a leg portion;
   a force driver device adapted to press the flanges together from opposite sides of the flanged connection;
   wherein the foot portion engages the outer face of each flange between circumferentially adjacent bolt holes, and
   wherein each clamp device has a collar with a bore extending parallel to the axis of the connection, the collar being radially spaced from the axis of the connection, wherein the bore of the collar is configured to receive and retain a threaded fixing which connects the collar on one side of the connection between the flanges with a collar on the other side of the connection, the axis of the bores in each of the collars being aligned with one another at a radial spacing that clears the flanges, and wherein the threaded action of the fixing between the collars provides an axial force to force the two flanges together.

2. The connection assembly as claimed in claim 1, wherein the connection assembly comprises a dogleg portion between the foot and the force driver device.

3. The connection assembly as claimed in claim 1, wherein the clamp devices are applied across the flanges, with one part of each clamp device bearing on a respective opposing flange and forcing the flanges together in a direction parallel to the axis of the flanged connection.

4. The connection assembly as claimed in claim 1, wherein the force driver device comprises a screw threaded device.

5. The connection assembly as claimed in claim 1, wherein the force driver device comprises a hydraulic device.

6. The connection assembly as claimed in claim 1, wherein the leg portions of the first and second clamp devices bear the foot portions, wherein each foot portion is adapted to engage an outer face of the flange and the force driver device is adapted to engage each leg portion.

7. The connection assembly as claimed in claim 1, wherein each foot portion is adapted to engage an outer face of the flange at a first radial position with respect to the axis of the connection, and the force driver device is adapted to engage each leg portion at a second radial position with respect to the pipe, and wherein the first radial position is radially closer to the axis of the connection than the second radial position.

8. The connection assembly as claimed in claim 1, wherein each leg portion comprises a lever device adapted to apply axial force to the foot portion in response to pivotal movement of the lever.

9. The connection assembly as claimed in claim 1, comprising an adjustment mechanism to adjust the force applied to the flanges by the foot portion.

10. The connection assembly as claimed in claim 9, wherein the adjustment mechanism is configured to adjust the force applied to the flange by a foot of one clamp device, independently of the force applied by other clamp devices.

11. The connection assembly as claimed in claim 9, wherein the adjustment device is incorporated in the leg.

12. The connection assembly according to claim 1, incorporating a mechanism to control the tension in the force driver device.

13. The connection assembly as claimed in claim 1, wherein the foot portion engages the outer face of each flange equi-distantly between adjacent bolt holes.

14. The connection assembly as claimed in claim 1, wherein the foot portions transmit forces to the flanges without applying forces to the threaded fixings.

15. The connection assembly as claimed in claim 1, wherein the force driver is located at the free end of the leg, and comprises a tensioning device that is applied around the free end of the leg to move it and the leg as a lever to apply the force to the flanges.

16. The connection assembly as claimed in claim 1, wherein more than two clamp devices are provided, equi-distantly spaced around the circumference of the flange.

17. The connection assembly as claimed in claim 1, wherein clamp devices are applied to the flanges circumferentially between each bolt hole passing through the flanges.

18. A connection assembly comprising two pipes and a flange clamping apparatus for supporting a flanged connection between the two pipes, the connection having an axis, and the pipes having a respective flange extending radially from each pipe, away from the axis, wherein the flanges are provided with circumferentially spaced bolt holes which receive threaded fixings, the clamping apparatus comprising:
at least first and second clamp devices adapted to be applied to circumferentially spaced portions of the flanges, each of the first and second clamp devices having a foot portion adapted to engage an outer face of a flange and a leg portion;
a force driver device adapted to press the flanges together from opposite sides of the flanged connection;
wherein the foot portion engages the outer face of each flange between circumferentially adjacent bolt holes, and
wherein each leg portion has a free end that extends axially away from the flange parallel to the axis of the connection, and wherein the free end of each leg portion, the foot portion, and the force driver device are radially spaced at different intervals away from the axis of the connection.

19. The connection assembly as claimed in claim 18, wherein the free end of the leg is spaced radially away from the wall of the pipe, allowing the leg to be pressed radially inwards towards the wall of the pipe to pivot the leg and force the foot portion axially against the flange.

20. The connection assembly as claimed in claim 18, wherein the free end of the leg is pressed radially inwards towards the axis of the connection by a band that engages a head on the free end of the leg.

21. The Connection assembly as claimed in claim 20, comprising an adjustment device arranged to act on the band and adapted to change the tension in the band to move the head radially inwards towards the axis of the connection.

22. The connection assembly as claimed in claim 21, comprising an adjustment device, wherein the adjustment device comprises a wedge arranged to be driven between a body of the clamp device and a fixing, in order to change the spacing between them.

23. The connection assembly as claimed in claim 21, comprising an adjustment device connected across a pivot axis and arranged to adjust the angle between the two components on either side of the pivot axis.

24. The connection assembly according to claim 21, wherein the adjustment device comprises a screw threaded fixing that can be turned by a driver, allowing adjustment of the force after the clamp device has been applied to the flanges.

* * * * *